(No Model.) 4 Sheets—Sheet 1.
A. J. GROVER.
SELF RECORDING CANAL, SEWER, OR RAIN GAGE OR METER.
No. 530,337. Patented Dec. 4, 1894.
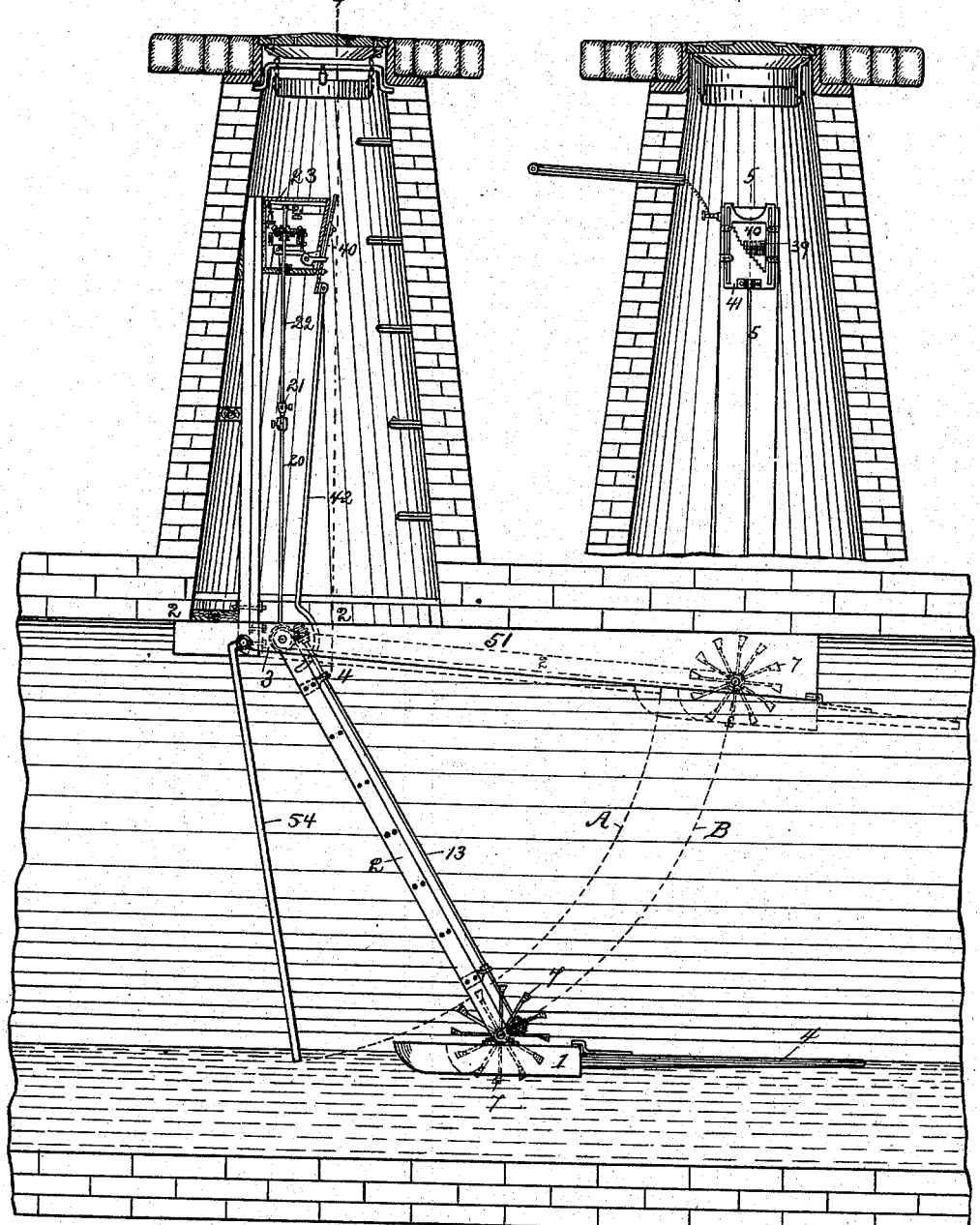
Witnesses
Albert Popkins
Miriam M. duPré
Inventor
Alva J. Grover,
By Howson & Howson,
Attorneys (No Model.) 4 Sheets—Sheet 2.
A. J. GROVER.
SELF RECORDING CANAL, SEWER, OR RAIN GAGE OR METER.
No. 530,337. Patented Dec. 4, 1894.
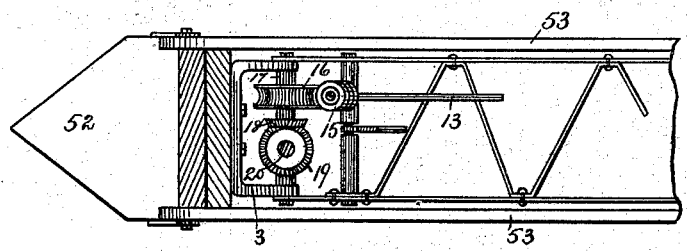
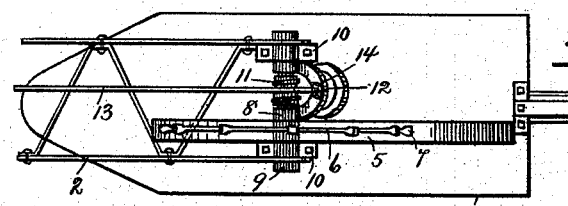
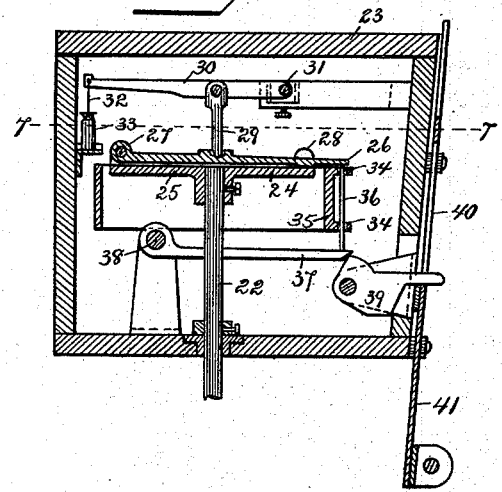
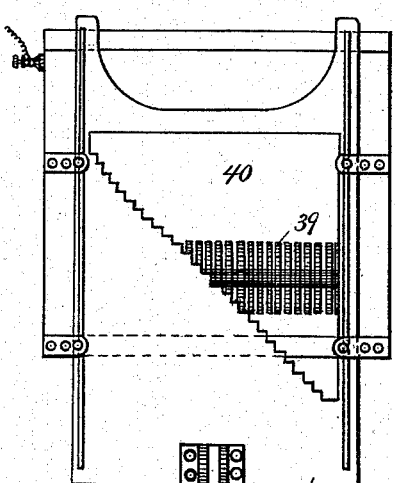
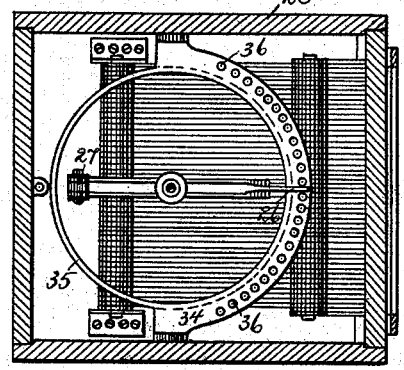
Witnesses
Albert Popking
Miriam M. duPré
Inventor
Alva J. Grover,
By Howson & Howson,
Attorneys (No Model.) 4 Sheets—Sheet 3.
A. J. GROVER.
SELF RECORDING CANAL, SEWER, OR RAIN GAGE OR METER.
No. 530,337. Patented Dec. 4, 1894.
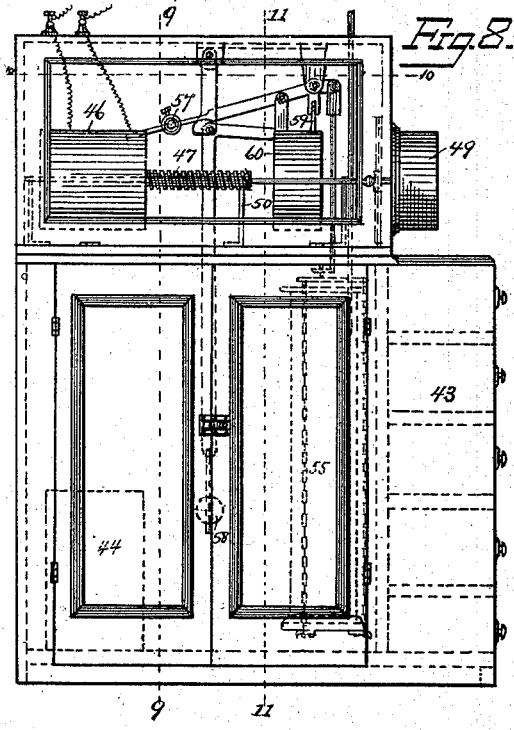
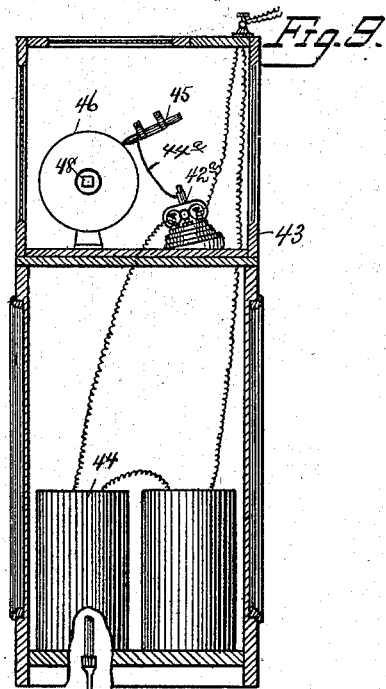
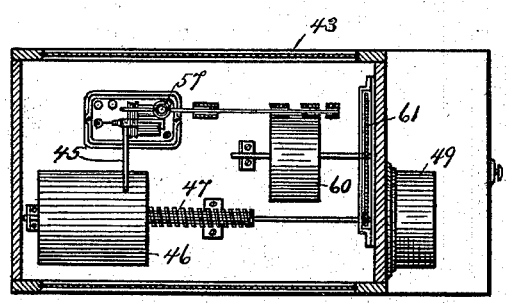
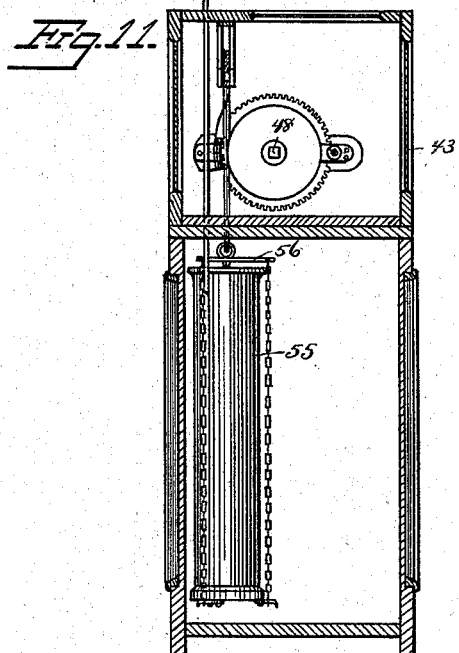
Witnesses
Albert Popkins
Miriam M. duPré
Inventor
Alva J. Grover,
By Howson & Howson
Attorneys.

(No Model.)  4 Sheets—Sheet 4.
A. J. GROVER.
SELF RECORDING CANAL, SEWER, OR RAIN GAGE OR METER.
No. 530,337.  Patented Dec. 4, 1894.
Fig. 12.
Fig. 13.
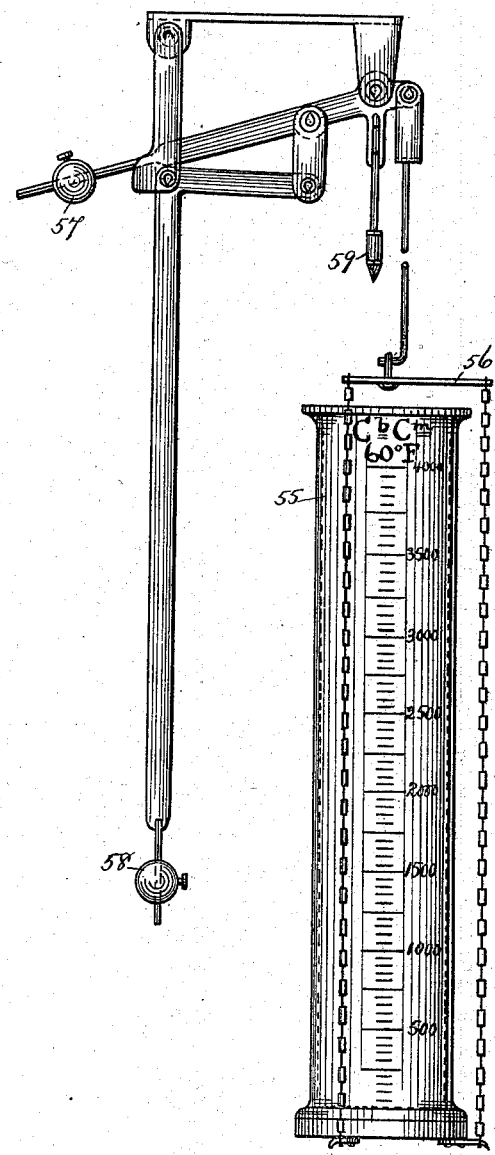
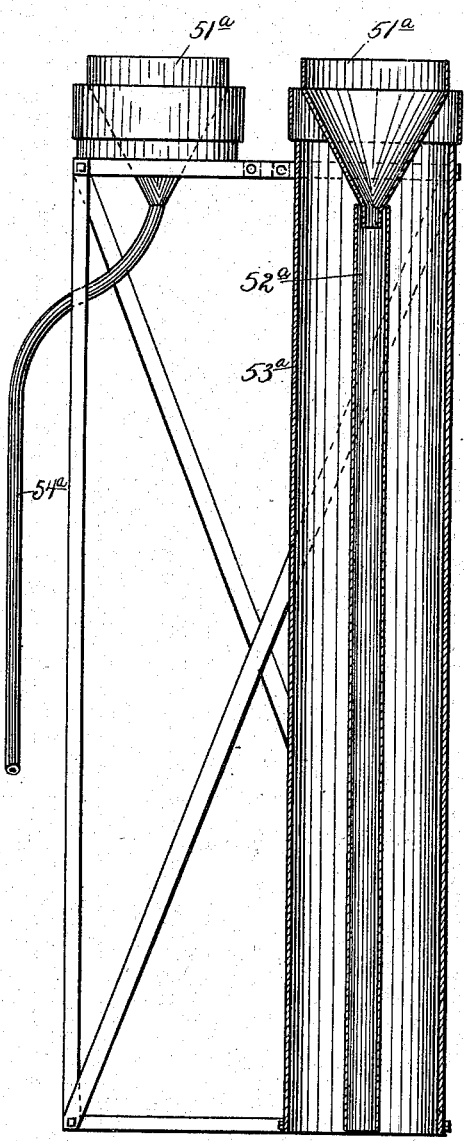
Witnesses
Albert Popkins
Miriam M. duPré
Inventor
Alva J. Grover,
By Howson & Howson
Attorneys.

UNITED STATES PATENT OFFICE.

ALVA J. GROVER, OF OMAHA, NEBRASKA.

SELF-RECORDING CANAL, SEWER, AND RAIN GAGE OR METER.

SPECIFICATION forming part of Letters Patent No. 530,337, dated December 4, 1894.

Application filed December 15, 1893. Serial No. 493,721. (No model.)

*To all whom it may concern:*

Be it known that I, ALVA J. GROVER, a citizen of the United States, residing at Omaha, Douglas county, Nebraska, have invented new and useful Improvements in Self-Recording Canal, Sewer, and Rain Gages or Meters, of which the following is a specification.

My invention relates to self-recording sewer gages, and to the combination therewith of a self-recording rain gage.

The objects of my invention are to provide a means for automatically and simultaneously recording the amount of rain fall, and the run off of surface water through sewers; to measure automatically the amount of sewage passing through a sewer; to automatically record the velocity of the sewage through a sewer; to automatically record the depth of sewage in a sewer.

Broadly considered my invention consists in a sewer gage with the recording mechanism combined with a rain gage and recording mechanism and the details thereof, as will appear in the specification to follow, having reference to the accompanying drawings forming a part thereof, and more particularly pointed out in the claims appended to this description.

Referring now to the drawings, in which the same reference characters designate the same parts throughout the different views, Figure 1, is a vertical section of a portion of a sewer and a manhole, showing the sewer gage in elevation, with electric key box in section. Fig. 2, is a section plan view, taken upon the line 2—2, Fig. 1. Fig. 3, is a plan view of boat or float. Fig. 4, is a part sectional view taken on line 4—4, Fig. 1. Fig. 5, is a vertical section of the key box on the line 5—5, Fig. 4. Fig. 6, is a front view of the key box. Fig. 7, is a transverse sectional view on line 7—7, Fig. 5. Fig. 8, is a side elevation of the recorder case. Fig. 9, is a vertical section thereof, taken on line 9—9, Fig. 8. Fig. 10, is a horizontal section thereof, taken on line 10—10, Fig. 8. Fig. 11, is a vertical section taken on line 11—11, Fig. 8. Fig. 12, is an enlarged side view of the scales for the rain gage. Fig. 13, is a front elevation of the rain gage.

The self recording sewer gage consists essentially of the gage proper, the key-box, the recorder and the storm shield.

Referring now more particularly to Figs. 1 to 4, it will be seen that the gage proper consists of a boat or float, 1, pivotally attached to the end of a built-up arm, 2, about eight feet long in the present instance, having its upper end journaled upon projections on the bracket, 3, firmly fixed to the arch of the sewer. This boat is preferably made of metal, in the present instance of galvanized iron, and it has its prow symmetrically curved, pointed, with the outer surface perfectly smooth, so as to offer the least resistance to the sewage flowing through the sewer. To keep the boat steady in the stream, a counterpoise, 4, is attached to the stern, which counterpoise is preferably made of copper, and about five feet in length upon a boat whose length is about three feet.

To one side of the central line of the boat, running fore and aft, is a well hole, 5, extending from about the curve of the bow to the stern, in which well hole is adapted to turn the paddle wheel, 6. This paddle wheel consists of a number of metal paddles, 7, screwed into the hub, 8, keyed or otherwise suitably secured to a steel shaft, 9, supported to turn in the journal boxes, 10, which journals are secured to the boat at equal distances on each side of the fore and aft, or longitudinal central, line of said boat.

The paddles are preferably made of iron having round shanks with flattened outer ends, forming an oval paddle, in the present instance of two by one inch dimensions and having the flattened ends surrounded by a metal plate, preferably of copper, about one-half inch high at the tip end and gradually coming to a point where the said plate joins the shank, thereby forming a cup-shaped paddle against which the current strikes to turn the wheel. I may state that the diameter of the wheel is preferably about eighteen inches.

Keyed upon the shaft, 9, with the paddle wheel, is a worm, 11, preferably of brass, meshing with a worm wheel, 12, having thirty-one teeth, which is supported upon the end of the shaft, 13, by a brass stirrup, 14, whose arms encircle the shaft, 9. The shaft, 13, is supported by suitable bearings upon the arm 2, and carries at its upper end a second worm, 15, meshing with a worm wheel, 16, having thirty-three teeth, mounted upon a shaft, 17, in the bracket, 3.

Projecting from the side of the worm wheel, 16, is a bevel gear, 18, having twelve teeth, meshing with another bevel gear, 19, having twenty-four teeth, secured to the lower end of the vertical shaft, 20, which latter shaft transmits motion through a knuckle joint, 21, to the shaft 22, passing centrally upward into the key-box, 23, and provided on its upper end with the electric circuit breaker or key, 24. This key consists of two parts, a lower or body part, 25, and an upper part or finger, 26. The body part is secured by any suitable means, such as set screw and collar, to the upper end of the shaft, 22, and is provided on its face with two sets of lugs, 27, 28, to the former of which the finger, 26, is hinged, while the free end is guided between the latter. By this construction, while the key as a whole may rotate with the shaft, 22, the upper or finger part may be raised or lowered, for a purpose presently to be described. With the gearing described it will require two thousand and forty-six revolutions of the paddle for one revolution of the key.

Resting in a socket or recess on the upper part of the finger, 26, is a link, 29, pivoted at its upper end to a lever, 30, fulcrumed at 31, and having at its other end a contact device or wire, 32, normally closing a current through the mercury cup, 33, suitably supported within the key-box.

Passing through holes in the flanges, 34, of a collar, 35, suitably secured to the sides of the key-box, is a series of pins, 36, in the present instance twenty-four in number, the upper ends of which are beveled and adapted to engage the beveled outer edge of the finger, 26, of the electric key, while the lower ends of said pins freely rest upon the outer ends of a corresponding number of dogs, 37, pivoted below the collar, 35, upon the same horizontal pivot, 38. The outer ends of these dogs also engage the upper cam surfaces of another set of dogs, 39, similarly pivoted and having fingers projected through the triangular opening, 40, in the index slide, 41, which is adapted to guides upon the front of the box. The diagonal line of this opening is cut to form a series of steps as shown, equal in number to the pins, and one-fourth inch deep, each of which steps is adapted to engage one of the fingers of the dogs, 39, when the index slide is moved upward.

The arm, 2, which is pivoted to projections on the sides of the journal boxes, has its bearings concentric with the paddle wheel shaft and worm thereon, at its lower end, and with the worm wheel at its upper end, thus giving the boat or float freedom to rise and fall with the flood in the sewer. As the boat rises therefore with the sewage, the arm, 2, is swung about its upper pivot, and moves by means of the rod, 42, the slide, 41, upward. This rod, 42, is connected to the arm, 2, at a point about six inches from the upper pivot of said arm. This upward movement of the slide causes the steps to lift the fingers of the dogs, 39, which in turn lift the dogs, 37, and the respective pins, 36. A depth of four inches will be indicated by one pin up; eight inches, by two pins up and so on as will be readily understood from the foregoing description, as will be more particularly described hereinafter. Now, while the pins are raised the paddle wheel being turned by the current causes the shafts, 13, 20, and 22, through the gears thereon, to rotate, thus revolving the electric key, the outer end of which coming in contact with the raised pins will be lifted, thereby lifting the lever, 30, and breaking the current through the mercury cup.

An insulated wire having one end submerged in the mercury cup leads through a conduit, or overhead, as desired, to the office through an electro-magnet, $42^a$, in the recorder case, 43, and thence completing the circuit through a local battery, 44, in said case. Secured by a spring, $44^a$, to the armature of this electro-magnet, is a glass pen, 45, held in contact with the chronographic drum, 46. This drum is secured to a brass sleeve, 47, that is adapted to slide longitudinally upon the square shaft, 48, connected by a knuckle joint to the hour shaft of a clock, 49. This brass sleeve is provided with a worm, one-fourth inch to a turn, extending from the end of the drum, 46, a distance at least the length of the drum which in the present instance is six and one-half inches. A stay, 50, secured to the register case engages the worm, thus moving the drum or cylinder longitudinally one-fourth inch, whereby the hours are marked in spiral lines upon suitable lithographed paper on the drum, and a continuous automatic record, for twenty-six hours in the present case is obtained, for it is obvious that when the current through the mercury cup is broken by the pins acting upon the electric key, as described, the armature of the electro-magnet will be released, and the spring of the armature will move the pen thereby making a record upon the lithographed paper from which the depth of sewage and the velocity of the perimeter of the paddle wheel is easily obtained, and from which the velocity of the current in the sewer may be computed.

A storm shield, 51, is provided for protecting the float whenever the sewer becomes flooded by excessive rain. This shield consists of a solid block of wood covered with an iron nose, 52, and having two boards, 53, running back from this nose, placed at the arch of the sewer, a distance apart slightly greater than the width of the boat. A third board is fastened to the ends of these side boards, and the whole is securely fastened to the arch of the sewer and firmly stayed in the manhole. Just ahead of the bracket, 3, a cover, 54, is pivotally attached. This cover is about half the length of the boat, shorter than the arm, 2, so that as the boat is raised by the flood, this cover will swing in the arc, A, inclosed by the arc, B, in which the arm, 2, swings, thus closing the opening between the nose of the shield and the bow of the boat when the latter is housed by the shield. The side boards of the storm shield will securely hold the boat with the wheel just below the top of the arch and thus prevent any injury to the boat that would otherwise occur were it not so protected.

For the purpose of securing an automatic and simultaneous record of the rain fall together with the record of the amount of run off surface water, and the velocity of the same through the sewer, I combine with the sewer gage a self recording rain gage. This rain gage with its connections may be arranged as shown in Figs. 10 to 13, where the preferred form of such gage is shown, consisting of a slightly modified form of the standard tops, 51$^a$, in use by the United States Weather Bureau. These tops, 51$^a$, gather one thousand cubic centimeters of water from one inch rain fall, and from one of them the water gathered is conveyed to a copper tube or cylinder, 52$^a$, in which the water is measured in the usual way by a stick. This cylinder is preferably surrounded by a cylinder, 53$^a$, for protecting the same from heat. From the other top the water is conveyed by a tube, 54$^a$, of suitable length to a graduated jar, 55, suspended upon a pair of scales, 56, located in the recorder case. The jar is counterpoised by the ball, 57, and upon a long arm suspended by two links is a second adjustable ball or weight, 58. As the jar fills with water the ball, 58, is gradually forced from the vertical, its lever arm increasing as the sine of the angle of deflection. At the same time a glass pen, 59, attached to the arm of the scales, and held in contact with the chronographic drum, 60, Fig. 8 is moved to the left, thereby recording upon a suitable lithographed paper upon the drum, the time and amount of rain fall. In the present instance the shaft of the chronographic drum, 60, is shown connected by a knuckle joint to a gear, 61, having one hundred and eighty-nine teeth meshing with a smaller gear or pinion upon the same hour shaft with the drum, 46, having seven teeth thus giving automatic record for twenty-seven hours.

From this description it will be clearly understood that the two records are made automatically and simultaneously, so that a reliable comparison is had between the amount of rain fall and the amount discharged through the sewer. The primary intention of this combination being to discover the relation of rain fall and run off of storm waters in sewers, and as it is absolutely essential for the scientific determination of this relation that the two records should be made by co-ordinate parts of the same automatic recording device, thus eliminating all personal errors in the record, it is clear that the sewer gage, necessarily located at the mouth of a sewer, with the electric connection to some centrally located office in the district to be gaged, recording simultaneously with a rain gage on a chronographic drum or drums, operated by the same clock, as herein described, mutually acts with the said rain gage mechanism to accomplish the result desired and are necessary to each other.

I will now describe sufficiently in detail the operation of my device to enable the principles upon which the records are made to be clearly understood. The depth of sewage is determined by the number of pins raised in the key box which number is recorded on the chronographic drum, 46, by notches or breaks in the spiral line marked by the pen, 45. The electric circuit being normally closed the armature of the electro-magnet, 42$^a$, is held to the magnet and the pen, 45, which is attached to this armature remains stationary while the drum, 46, revolves under it marking spiral lines on the paper surrounding the drum.

The finger of the electric key, 24, in order to pass one of the lifted pins, 36, has to rise up as described and in so doing breaks the electric current and releases the armature which is drawn away from the magnets by a spring, thus moving the glass pen, 45, which is attached to the armature and records a break in the spiral line. If two pins are up two breaks as notches will occur in the line. If twenty-four pins are up then twenty-four notches or breaks will be recorded in the line.

As the arm, 2, is about eight feet long and the point of attachment of the rod, 42, about six inches from the arm's upper pivoted end, the rod will move through just one-sixteenth the space that the float end of the arm does. Hence if the float rises four inches the rod, 42, will rise one-fourth of an inch and the slide at its upper end will be raised one-fourth of an inch and the first step in the slide, 41, will raise one pin. If the float rises eight inches two pins will be raised and two notches recorded on the drum, and so on till the whole 24 pins may be raised and recorded.

The pen, 59, attached to the arm of the scales passes as the jar, 55, fills with water, in the arc of a circle, with the knife edge as a center. Curved lines are therefore necessary to mark the hour and minute lines on the paper, for the chronographic drum, 60. The other lines representing the inches and tenths of an inch are determined by actual trial gaging the water in the graduated jar and marking the actual position of the pen for each tenth of an inch of water thus eliminating any error in weights of levers.

As the pins, 36, are arranged so that the finger of the key, 24, only has to pass over about sixty degrees of the circle to traverse over all the pins, it is evident that at least two thirds of the line will be clear of notches and that the time from one series of notches to the last of another series of notches is the time necessary for the paddle wheel to make two thousand and forty-six revolutions, which are necessary in this particular case to turn the electric key through a full circle. From the data thus recorded the velocity is readily obtained.

In this application I do not specifically claim the automatic rain gage disclosed, as that forms the subject matter of my application for a patent filed of same date herewith, Serial No. 493,722.

From the foregoing description the operation of my device will be apparent without further detail; for it is clear that the gearing between the paddle wheel and the revolving key being known, the number of revolutions of the former to make one of the latter is readily ascertained, and is a constant for a given gearing. The depth of the steps upon the sliding plates being given, the number of pins up at any time will indicate the depth in the sewage. The velocity of the perimeter of the paddle wheel having a known relation to the velocity of the current, it will be easily seen how the record made upon the chronographic cylinder will give the necessary data from which the depth of sewage and its velocity is easily obtained, and from this amount of discharge is easily deduced.

While I have shown a preferred form of circuit breaker, it is to be understood that my invention includes other suitable forms as well, since I am not aware that heretofore anyone has made a self recording sewer gage comprising as elements a gage mechanism, a circuit breaking mechanism, and recording mechanism, and I therefore do not wish to restrict myself to the specific form of these devices shown.

While I have in some instances designated the proportions of various parts of my device, the number of teeth to gears, the material used in construction and other details, it is to be understood that I do not by these statements limit myself to such details, for they are only given to more fully illustrate the practical operation of the device, and all may be varied without departing from the spirit of my invention.

For the drum, 60, I preferably employ a lithographed paper having curved lines thereon representing the hours and minutes, with cross lines representing inches and tenths of inches; while the drum, 46, has hour and minute lines, with place of date, and arranged so as not to be confusing as to a. m. and p. m., beginning at 1, and ending at twenty-four hours.

I claim as my invention—

1. A self recording sewer gage comprising a float pivoted by an arm to the sewer, a wheel upon said float, a circuit breaker consisting of a revolving key, mechanism between said wheel and key for revolving the same, mechanism between the float and key for periodically lifting the key as it revolves, a contact device operated by said key as it lifts, a chronographic drum and a magnetically operated pen in contact with said drum, whereby as the circuit is broken the said pen may record a curve upon the drum from which the depth of sewage and the velocity of current are obtained, substantially as described.

2. In a self recording sewer gage, the combination of a pivoted float, a circuit breaker, a single electric circuit in which the circuit breaker is located, an electro magnet in circuit therewith, a pen attached to the armature of said magnet, and a chronographic drum, with means controlled by the float for operating the circuit breaker, whereby all the movements of the float may be recorded on the drum over a single circuit, substantially as described.

3. In a self recording gage, the combination with a pivoted float, carrying a current wheel, of a circuit breaker, an electro-magnet in circuit therewith, a chronographic drum, a pen held in contact with said drum, mechanism between the circuit breaker and wheel for operating said circuit breaker, whereby the pen records breaks in a line on said drum from which the depth and velocity of sewage may be determined, substantially as described.

4. In a self recording sewer gage the combination with the float carrying a current wheel, an arm pivoted to said float and to the sewer, a shaft upon said arm geared to the wheel, a second shaft geared with the first shaft, provided on its upper end with a key or finger, a key box in which said key is adapted to turn, a sliding plate on one side thereof provided with a series of steps, a rod connecting the arm of the float with said plate, a set of levers adapted to engage the steps of the sliding plate, a series of pins adapted to be raised by said levers, a contact device connected with the revolving key with means for recording the make and break of an electric circuit through the contact device, substantially as described.

5. In a self recording sewer gage, the combination with the gage mechanism, of a circuit breaker consisting of a key box having a revolving key, a contact device connected therewith, a sliding plate adapted to guides upon the box, and having a stepped opening therein, a series of pivoted dogs or levers adapted to engage said plate, and a series of pins engaging said dogs, whereby as the plate lifts the pins are raised and lift the key as it revolves, substantially as described.

6. The combination with a sewer gage mechanism, a chronographic drum, means for recording the movements of the gage mechanism upon said drum, a rain gage mechanism, a chronographic drum, with means for recording the movements of said rain gage upon the latter, and a clock having its hour shaft geared with and operating both drums simultaneously, substantially as described.

7. A storm shield for the float of a sewer gage consisting of two side boards attached to a block and secured to the arch of the sewer, an end board, and a hinged cover adapted to close the opening between the forward ends of the float and the shield, substantially as described.

8. The combination with a sewer gage float, an arm pivotally attached to the arch of the sewer and to the float, a storm shield having a pointed forward end with side and end boards secured to the arch of the sewer, and a cover hinged ahead of the said arm, and adapted to rest against the storm shield and close the opening between the float end and the nose of the shield, substantially as described.

9. A float for sewer gages consisting of a metal boat having a pointed bow and provided with a tail or counterpoise, and having a well hole with a paddle wheel mounted upon said boat and adapted to turn in said well hole, substantially as described.

10. In a self recording sewer gage, the combination with the gage mechanism, of a circuit breaker consisting of a key box having a two part revolving key, one of said parts hinged to the other, a contact device connected therewith, a sliding plate adapted to guides upon the box, and having a stepped opening therein, a series of pivoted dogs or levers adapted to engage the plate, and a series of pins engaging said dogs, and adapted to engage the hinged part of the key as it revolves, substantially as described.

11. In a self recording sewer gage, the combination with the float carrying the wheel, the revolving shaft provided at its upper end with a key having two parts the upper part of which is hinged to the lower, connections between the wheel and shaft for rotating said shaft, a contact device connected to the key, with means for raising the hinged part thereof, to break the circuit, substantially as described.

In testimony whereof I have signed my name to this specification in the presence of two subscribing witnesses.

ALVA J. GROVER.

Witnesses:
ANDREW ROSEWATER,
JOHN McLEARIE.